Patented Dec. 26, 1950

2,535,706

UNITED STATES PATENT OFFICE 2,535,706

4-METHYL-1,2-DITHIA-4-CYCLOPENTENE-3-THIONE

Donald R. Stevens, Wilkinsburg, and Arthur C. Whitaker, Oakmont, Pa., assignors to Gulf Research & Development Company, Pittsburgh, Pa., a corporation of Delaware No Drawing. Application March 7, 1947, Serial No. 733,197

4 Claims. (Cl. 260—327)

This invention relates to a new sulfur-containing chemical compound having the empirical formula $C_4H_4S_3$, and to a method for preparing such compound by reaction between sulfur and isobutylene. This compound is a light orange-colored crystalline solid having a melting point of about 40° C. It is substantially insoluble in water, but is soluble in a variety of organic solvents including benzene, acetone, methanol, pentane, and ethyl ether. It is useful as a chemical intermediate and as an additive in certain hydrocarbon fuel compositions.

The new chemical compound provided by the invention is obtained by reacting elemental sulfur with isobutylene at somewhat elevated temperatures and pressures. The isobutylene is preferably employed in substantially pure form, but may be employed in admixture with other hydrocarbons, for example, as it occurs in the gaseous hydrocarbon mixtures obtained in refinery cracking operations. It may also be prepared in situ by the dehydration of tertiary butyl alcohol under the same conditions of reaction as those required for the reaction with sulfur. The reactants are preferably employed in a mole ratio of about 1.25 moles of sulfur per mole of isobutylene although this ratio may be varied between wide limits. e. g. between about 1 and about 5 moles of sulfur per mole of isobutylene.

The reaction takes place readily at temperatures between about 140° and about 180° C. under autogenic pressure. Accordingly, it is conveniently carried out simply by charging the desired quantities of the two reactants into an autoclave or other suitable pressure vessel, and heating to the desired reaction temperature. The time required for completion of the reaction varies with the temperature employed as well as with the purity of the isobutylene and the molar ratio of the reactants. Ordinarily, however, the reaction is usually complete in from about ½ to about 4 hours, as indicated by the pressure within the reaction vessel dropping to a constant low value.

Upon completion of the reaction, the crude reaction product is obtained as a dark oily liquid containing small quantities of unreacted sulfur and hydrogen sulfide. The desired crystalline compound may be recovered directly from the liquid reaction product by dissolving the latter in a solvent, such as pentane, petroleum ether, diethyl ether, and the like, and thereafter cooling the resulting solution to allow the solid compound to crystallize. However, we have found that a product of higher purity is usually obtained if the liquid reaction product is first distilled under vacuum. Accordingly it is considered preferable first to filter the liquid product to remove any unreacted sulfur, and then subject it to distillation under vacuum. The fraction distilling at temperatures between about 50° and about 110° C. under 1 mm. pressure is collected and diluted with an equal volume of pentane or other miscible organic solvent and is cooled to a low temperature to allow the desired $C_4H_4S_3$ compound to crystallize out of solution and be recovered by filtration. The product so obtained is of sufficient purity for most uses, but if a more highly purified product is desired, it may be recrystallized one or more times from a suitable organic solvent, e. g., a mixture of equal parts of pentane and ethyl ether, petroleum ether, ethyl alcohol, etc.

The following example will illustrate one way in which the principle of the invention has been applied, but is not to be construed as limiting the same.

Example

Approximately 265 parts by weight of isobutylene and 155 parts by weight of sulfur were placed in an electrically-heated rotating autoclave, and heated to a temperature of about 155° C. At this temperature, reaction began to take place, and the pressure, which had increased to about 800 pounds per square inch during the heating period, decreased rapidly. After forty minutes, the pressure remained constant at 100 pounds per square inch and the temperature had increased to 160°–170° C. The autoclave was cooled and the contents were withdrawn, whereby there was obtained a crude liquid reaction product containing very little unreacted sulfur and hydrogen sulfide and substantially no unreacted isobutylene. This product was filtered and was then fractionally distilled under vacuum. The fraction distilling between 52° and 102° C. under 1 mm. pressure was collected and diluted with an equal volume of pentane. The resulting solution was then cooled to a temperature of about −80° C., whereby the solid $C_4H_4S_3$ product crystallized in the form of fine orange-colored needles. This crystalline solid was filtered off and recrystallized from solution in equal parts of pentane and ethyl ether. The product so obtained had a melting point of 40° C. Further recrystallization did not raise the melting point appreciably. This product had the following analysis:

|  | Found | Calculated for $C_4H_4S_3$ |
|---|---|---|
| Carbon_____per cent__ | 32.44 | 32.43 |
| Hydrogen_____do____ | 2.80 | 2.70 |
| Sulfur_____do____ | 64.90 | 64.92 |
| Molecular Weight_____ | 145 | 148 |

Other analytical data and chemical characteristics indicate that this product is probably 4-methyl $\Delta^4$-dithiacyclopentene-3-thione, or by a different nomenclature, 4-methyl-1,2-dithia-4-cyclopentene-3-thione having the structural formula:

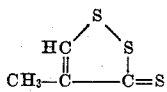

The following tabulated data illustrate the use of the new compound as an additive in Diesel fuel compositions for the purpose of improving the ignition qualities of the fuel as indicated by an increase in its cetane number. These data were obtained by determining the inspection characteristics and cetane number of a composition consisting of a typical Diesel fuel oil and the indicated amount of the $C_4H_4S_3$ compound. Comparative data are presented on the fuel base itself, which was a Mid-continent gas oil of the Diesel fuel type.

|  | Fuel Base | Fuel Base plus Additive |
|---|---|---|
| Fuel Base, per cent by weight_____ | 100.00 | 96.92 |
| $C_4H_4S_3$ Compound, per cent by weight____ | 0.00 | 3.08 |
| Gravity, °API_____ | 31.7 | 30.9 |
| Viscosity @ 100° F., SUV_____ | 38.5 | 38.4 |
| Carbon Residue, per cent_____ | 0.01 | 0.01 |
| Sulfur Content, per cent by weight_____ | 0.18 | 2.07 |
| Cetane Number_____ | 45.5 | 51.3 |
| Increase in Cetane Number_____ | 0.0 | 5.8 |

Other modese of applying the principles of our invention may be employed instead of those explained, change being made as regards the operational conditions or ingredients employed, provided the product defined by any of the following claims be obtained, or the step or steps stated by any of the following claims be employed.

We, therefore, particularly point out and distinctly claim as our invention:

1. As a new chemical compound, the orange-colored crystalline solid, 4-methyl-1,2-dithia-4-cyclopentene-3-thione.

2. The method of making the orange-colored crystalline compound, 4-methyl-1,2-dithia-4-cyclopentene-3-thione, which comprises heating a mixture of sulfur and isobutylene at a temperature between about 140° C. and about 180° C. and under autogenic pressure, subjecting the reaction product so obtained to fractional distillation, and recovering said compound from the fraction which distills between about 50° C. and about 110° C. under 1 mm. pressure.

3. The method of making the orange-colored crystalline compound, 4-methyl-1,2-dithia-4-cyclopentene-3-thione, which comprises heating a mixture of sulfur and isobutylene in a molecular ratio of from about 1 to about 5 moles of sulfur per mole of isobutylene at a temperature between about 140° C. and about 180° C. and under autogenic pressure for from about 0.5 to about 4 hours, subjecting the reaction product so obtained to fractional distillation, and recovering said compound from the fraction which distills between about 50° C. and about 110° C. under 1 mm. pressure.

4. The method of making the orange-colored crystalline compound, 4-methyl-1,2-dithia-4-cyclopentene-3-thione, having a melting point of about 40° C. and the empirical formula $C_4H_4S_3$, which comprises heating a mixture of sulfur and isobutylene in a molecular ratio of about 1.25 moles of sulfur per mole of isobutylene at a temperature between about 140° C. and about 180° C. and under autogenic pressure for from about 0.5 to about 4 hours, subjecting the reaction product so obtained to fractional distillation under 1 mm. pressure, recovering the fraction distilling between about 50° C. and about 110° C., dissolving said fraction in a miscible organic solvent, cooling the resulting solution to low temperature to cause said crystalline compound to crystallize out of solution, and separating said crystalline compound from the mother liquor.

DONALD R. STEVENS.
ARTHUR C. WHITAKER.

REFERENCES CITED

The following references are of record in the file of this patent:

UNITED STATES PATENTS

| Number | Name | Date |
|---|---|---|
| 2,102,564 | Bonstein | Dec. 14, 1937 |
| 2,376,338 | Browning | May 22, 1945 |
| 2,402,456 | Signaigo | June 18, 1946 |